Sept. 30, 1952     G. E. BJORKLUND     2,611,962
DENTAL DRILL
Filed Aug. 6, 1947
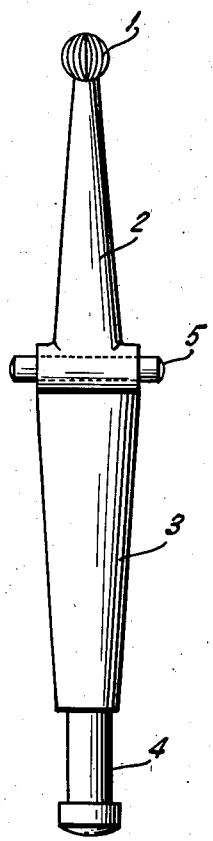
INVENTOR
Gustaf Erik Bjorklund
BY
ATTORNEY

UNITED STATES PATENT OFFICE 2,611,962

DENTAL DRILL

Gustaf Erik Björklund, Stockholm, Sweden

Application August 6, 1947, Serial No. 766,594
In Sweden August 12, 1946

2 Claims. (Cl. 32—48)

This invention relates to cutting tools and more particularly to drills designed for use by the dental profession.

Heretofore dental drills have been made of steel having the same general characteristics throughout the body of the drill. Such drills have proved relatively unsatisfactory due to the rapid rate of wear on the cutting edges and as a consequence there has been an attempt to solve the problem by forming the cutting portion of the drill of particularly hard material such as that of one or more of the various metals utilizing carbides, as for example tungsten, titanium, cobalt and the like. The particular articles of these hard metals are commonly prepared by a process known in the art as powder metallurgy or in other words the raw materials in finely comminuted condition are molded into the desired form under the action of heat and pressure, this hard tool bit or the like being then united to a shank usually of steel by various processes such as soldering or welding. Tool bits formed of this material are very hard and resistant to wear but are also very difficult to machine or work and therefore it is impractical from this standpoint as well as expensive to make a complete tool of such material.

A drill provided with a cutting portion of hard material such as that described above will have a relatively long life as far as the cutting portion is concerned but it has been found in the case of dental drills, particularly those designed for use in contra-angle hand pieces, that the shank portion of the drill has a relatively short life and therefore detracts from the advantages gained by using the hard cutting portion.

It is therefore an object of this invention to provide a dental drill having a relatively hard cutting portion and provided with a shank having a configuration and other features permitting a tight and accurate engagement of the drill shank with the hand piece, thus reducing wear caused by improper fit, vibration and play present in the prior art devices.

Further objects and advantages of the invention will be apparent from the following description taken in conjunction with the accompanying drawings, wherein:

The single figure is a view in elevation showing the drill of this invention.

With continued reference to the drawing, a dental drill or the like is provided and consists of an elongated member having a cutting portion 1 at one end and which may be formed of relatively hard material such as the various alloys of tungsten, titanium and cobalt, the process of making cutting tools from these materials being well known in the art. This cutting portion 1 may be formed in any desired shape or size and is mounted upon or attached to a reduced spindle 2 by any desired securing means such as by soldering or welding. Spindle 2 may be of a length to permit the desired penetration of the cutting portion 1.

Spindle 2 terminates in a shoulder substantially midway of the length of the drill and from this shoulder a tapered shank portion 3 extends toward the end of the drill opposite that of the cutting portion 1, the tapered shank 3 terminating in an annular groove or reduced portion 4.

The taper of the shank 3 is at such an angle that it is commonly known in the art as a sticky taper and this portion is received in a correspondingly tapered sleeve mounted in the hand piece which results in a tight, true engagement between the drill and the hand piece thus preventing wear due to improver fit, play or vibration.

The annular groove 4 is provided in order to permit engagement of conventional fastening means employed on dental hand pieces in order to securely clamp the drill in place in the hand piece.

In order to insure that there will be no relative rotation between the drill and the tapered socket receiving the shank 3 there is provided interengaging means in the form of a pin 5 which passes through the shank of the drill adjacent the point of the greatest diameter thereof. The protruding ends of pin 5 are adapted to be received in diametrically opposed slots or notches in the end face of the tapered socket receiving the drill. It has been found desirable to locate this pin 5 adjacent the point of greatest diameter in order that the removal of metal necessary for providing the opening for receiving the pin does not unduly weaken the drill at this point which might occur if the pin were located at a point of relatively small diameter.

It is of course obvious that projections formed on the surface of the drill might be utilized in place of the pin 5 but once again, any equivalent engaging means which may be utilized should be located adjacent the point of greatest diameter in order to provide the greatest possible strength.

It will thus be seen that there has been provided by this invention a relative simple and economical solution to the problem of utilizing relatively hard cutting materials and at the same time increasing the life of the other portions of a dental drill in order that the full advantages of the hard cutting material may be realized.

The drill of this invention may be very economically produced and represents a satisfactory solution to a problem long present in the art.

It will be obvious to those skilled in the art that various changes may be made in the invention without departing from the spirit and scope thereof and therefore the invention is not limited by that which is shown in the drawings and described in the specification but only as indicated in the appended claims.

What is claimed is:

1. A dental drill comprising an elongated member adapted for reception in the socket of a dental tool holder, a cutting portion on one end of said member, an annular groove adjacent the opposite end thereof, a tapered shank portion gradually enlarging from said annular groove and merging into an intermediate portion, the diameter of said intermediate portion being the same as the maximum diameter of said tapered shank, a tapered spindle portion gradually enlarging from said cutting portion and terminating in a shoulder formed on said intermediate portion, the average diameter of said spindle portion being less than that of said shank portion, and a pin projecting through said intermediate portion for preventing rotation of said drill in said holder, said groove being adapted to receive fastening means for maintaining said drill securely positioned within said holder.

2. A dental drill comprising an elongated member adapted for reception in the socket of a dental tool holder, a cutting portion on one end of said member, an annular groove adjacent the opposite end thereof, a tapered shank portion gradually enlarging from said annular groove and merging into an intermediate portion, the diameter of said intermediate portion being the same as the maximum diameter of said tapered shank, a tapered spindle portion gradually enlarging from said cutting portion and terminating in a shoulder formed on said intermediate portion, the average diameter of said spindle portion being less than that of said shank portion, and opposed projections on said intermediate portion for preventing rotation of said drill in said holder, said groove being adapted to receive fastening means for maintaining said drill accurately positioned within said holder.

GUSTAF ERIK BJÖRKLUND.

REFERENCES CITED

The following references are of record in the file of this patent:

UNITED STATES PATENTS

| Number | Name | Date |
| --- | --- | --- |
| Re. 8,360 | Williams | Aug. 6, 1878 |
| 147,959 | Morrison | Feb. 24, 1874 |
| 170,178 | Locke | Nov. 23, 1875 |
| 233,709 | Starr | Oct. 26, 1880 |
| 402,294 | Barney et al. | Apr. 30, 1889 |
| 1,679,291 | Byers | July 31, 1928 |
| 2,453,696 | Brooks | Nov. 16, 1948 |